United States Patent [19]

Walters et al.

[11] Patent Number: 5,706,901

[45] Date of Patent: Jan. 13, 1998

[54] SWIVEL HITCH ADAPTABLE FOR USE WITH EITHER A TRACTOR DRAWBAR OR TWO-POINT HITCH

[75] Inventors: James C. Walters; Matthew Jay Mentzer; Stephen Kenneth Parsons, all of Ottumwa, Iowa

[73] Assignee: Deere & Company, Moline, Ill.

[21] Appl. No.: 695,359

[22] Filed: Aug. 9, 1996

[51] Int. Cl.[6] .................................................. B60K 17/28
[52] U.S. Cl. .......................... 172/439; 180/53.1; 280/494
[58] Field of Search ............................. 56/14.7, 15.6, 56/13.6, 15.7, DIG. 14; 172/439, 490, 678, 47, 25; 180/53.1, 53.3, 14.2, 53.6; 280/492, 494

[56] References Cited

U.S. PATENT DOCUMENTS

| | | | |
|---|---|---|---|
| 3,874,530 | 4/1975 | Purdy | 414/83.32 |
| 3,998,471 | 12/1976 | Lutchemeien | 280/492 |
| 4,200,306 | 4/1980 | Helms | 280/494 |
| 5,158,500 | 10/1992 | McLean | 180/53.1 |
| 5,355,971 | 10/1994 | Austin et al. | 180/58.1 |

Primary Examiner—Henry E. Raduazo
Assistant Examiner—Robert Pezzuto

[57] ABSTRACT

The forward end of a draft tongue of a towed, power take-off driven implement carries a transmission including an upper right-angle gear box rigidly fixed to the tongue and a lower right-angle gear box swivelly mounted to the tongue for rotation about a vertical yaw axis. A swivel hitch includes a frame secured to the lower right-angle gear box and to an upright extending pivot member forming part of the swivel mounting of the lower right-angle gear box. A longitudinal pivot member is swivelly mounted to the hitch frame along a roll axis. In one embodiment, a vertical clevis is fixed to a forward end of the longitudinal pivot member and is pivotally connected to a drawbar adaptor for relative rotation about a horizontal transverse pitch axis, the latter being located close to the rear end of a drawbar received in a receptacle defined by the adaptor. In a second embodiment, a transverse arm is fixed to the forward end of the longitudinal pivot member and carries forwardly extending vertical clevises respectively at its opposite ends, the pair of clevises being adapted for connection to a pair of tractor draft links with the connection pins effecting the connection being located along a pitch axis.

11 Claims, 4 Drawing Sheets

5,706,901

1

SWIVEL HITCH ADAPTABLE FOR USE WITH EITHER A TRACTOR DRAWBAR OR TWO-POINT HITCH

BACKGROUND OF THE INVENTION

The present invention relates to towed implements equipped with apparatus for being powered by the power take-off (PTO) of a towing tractor, and more particularly relates to such implements as have a right-angle gear box coupled to the tractor PTO and mounted for swivelling about an upright axis and hitch structures for coupling such implements to the towing tractor so as to define pivot axes permitting the implement to undergo movement of three-degrees of freedom with one of the axes being coincident with that of the gear box.

Swivel hitches have been developed to provide tight turning capability to PTO powered implements. These hitches have usually been designed to attach to the tractor three-point hitch although some only use the two points of connection defined by the lower draft links. Further, U.S. Pat. No. 5,355,971, issued to Austin et al on 18 Oct. 1994 shows a hitch structure for coupling such an implement to the drawbar of the tractor.

SUMMARY OF THE INVENTION

According to the present invention, there is provided improved structure embodied in a swivel hitch for connection a PTO-driven, towed implement to a towing tractor.

An object of the invention is to provide a swivel hitch having structure which is easily adaptable for connection either to a pair of draft links, or a drawbar, of a towing tractor.

A further object of the invention is to provide a swivel hitch structure which includes a drawbar hitch adaptor optionally useable for connecting the hitch structure to a tractor drawbar by a transverse connecting pin located as far forwardly on the drawbar as practicable so as to minimize the bending force imposed on the drawbar due to the weight of the implement tongue.

Yet another object of the invention is to provide a swivel hitch structure including a longitudinal pivot member defining an axis about which the implement may roll relative to the tractor, the pivot member optionally including a clevis member, adapted for connection to a drawbar attaching device, or including a cross member having opposite ends respectively adapted for being connected to a pair of tractor draft links.

These and other objects of the invention will become apparent from a reading of the following description together with the appended drawings.

2

Figure 2:
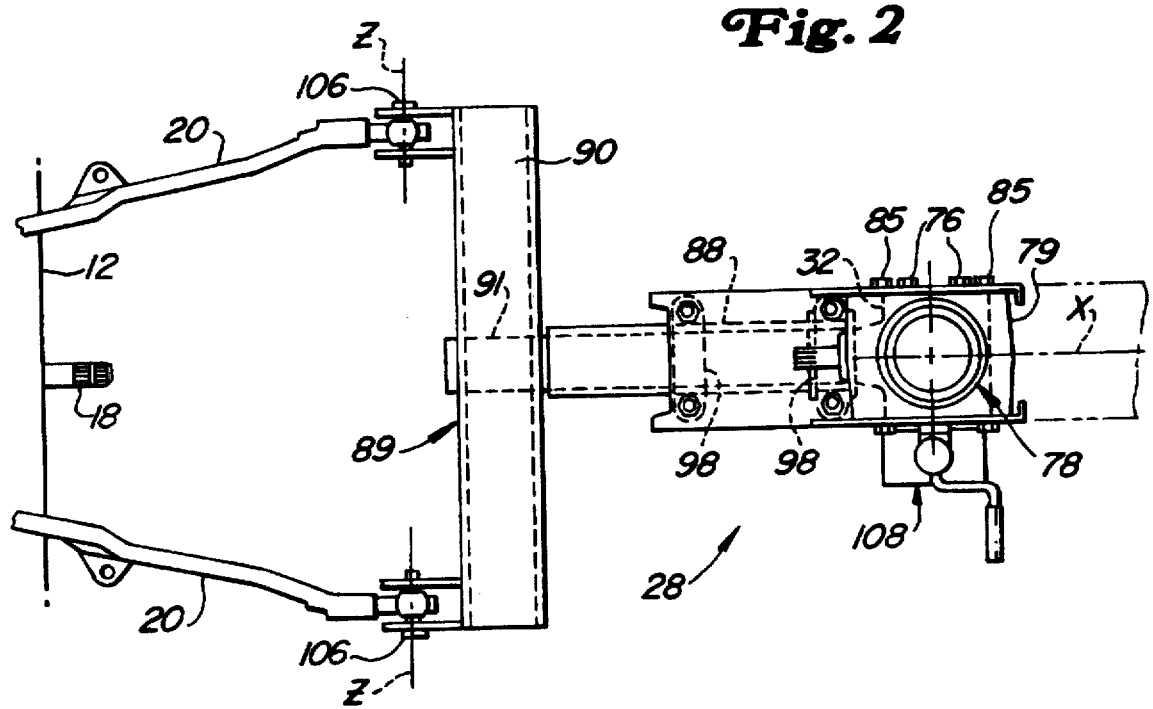
FIG. 2 is a top view of the rear portion of the tractor showing its connection to the swivel hitch and lower right-angle gear box shown in FIG. 1, but with the telescopic drive shaft connecting the tractor PTO to the input of the gear box being omitted for clarity.
Figure 3:
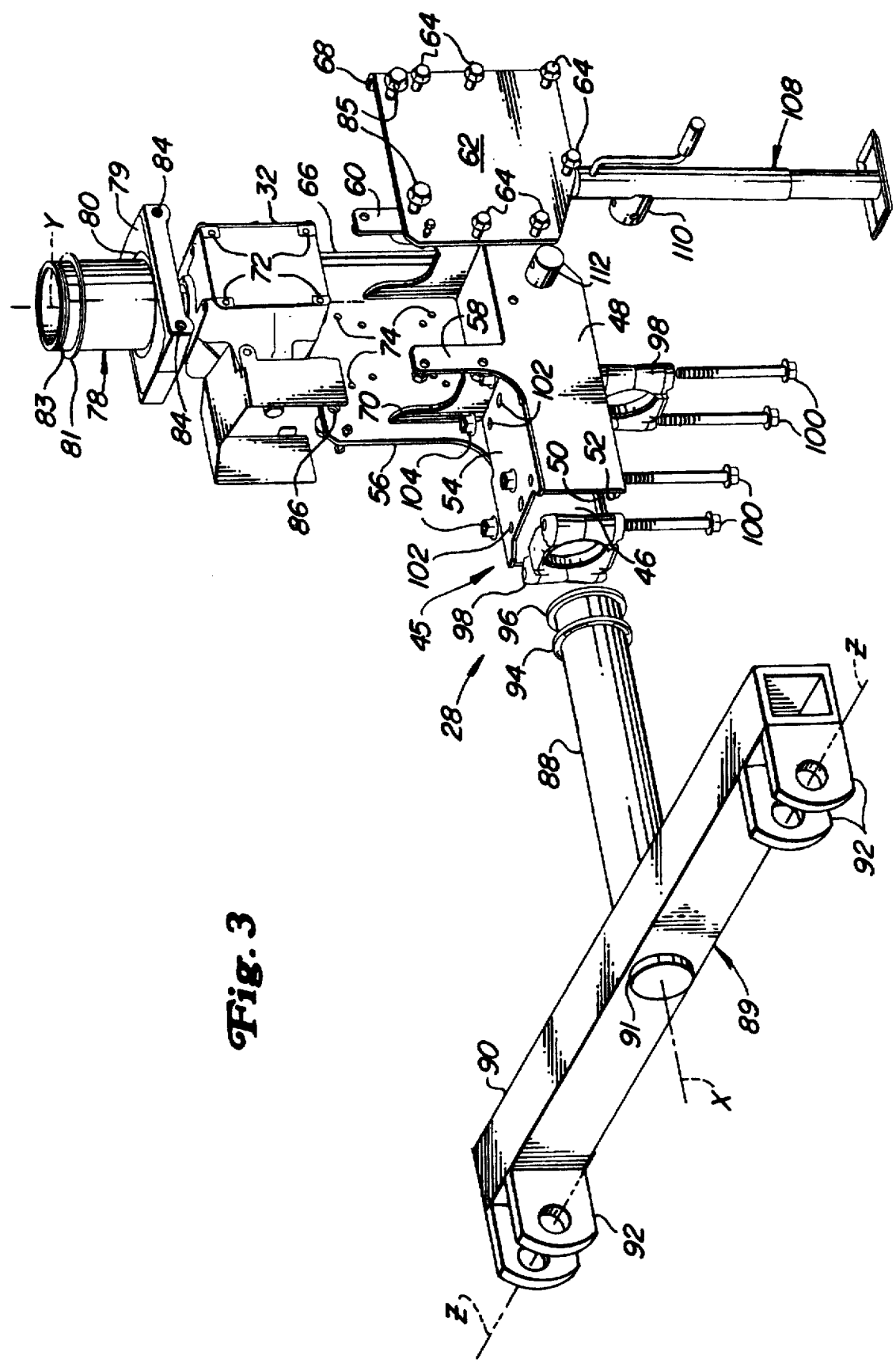

FIG. 3 is an exploded perspective view of the swivel hitch structure illustrated in FIG. 2.

Figure 1:
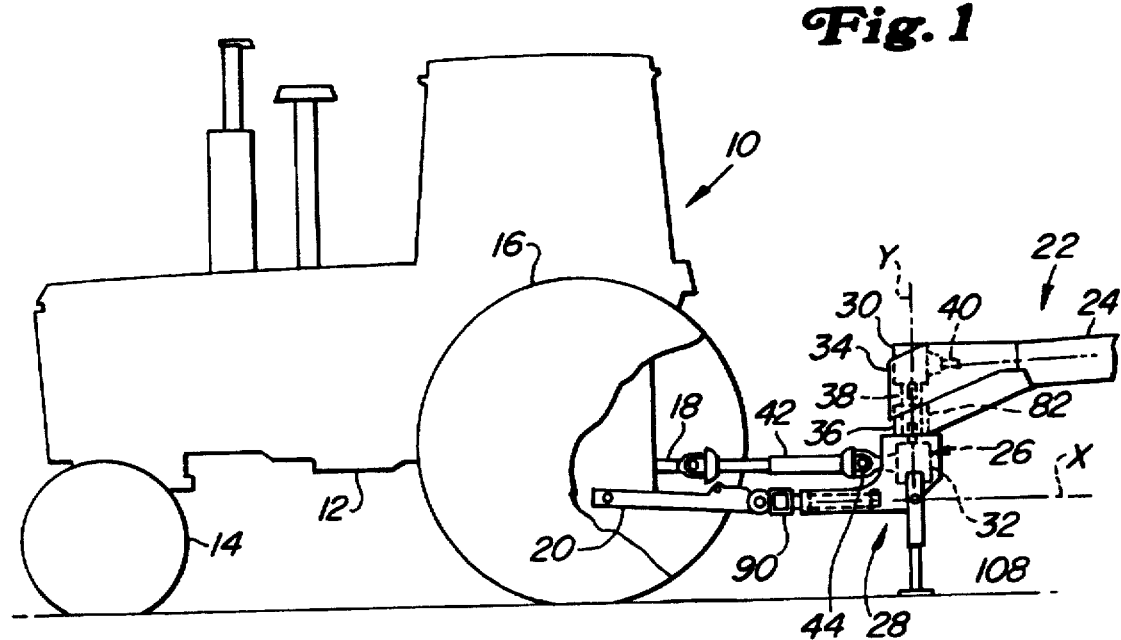
FIG. 1 is a somewhat schematic, right side elevational view showing a forward end portion of a towed, PTO driven implement connected to a towing tractor by a swivel hitch provided with a longitudinal pivot member constructed in accordance with a first embodiment of the invention wherein a cross member is fixed to the forward end of the pivot member and coupled to the lower draft links of the tractor three-point hitch.
Figure 4:
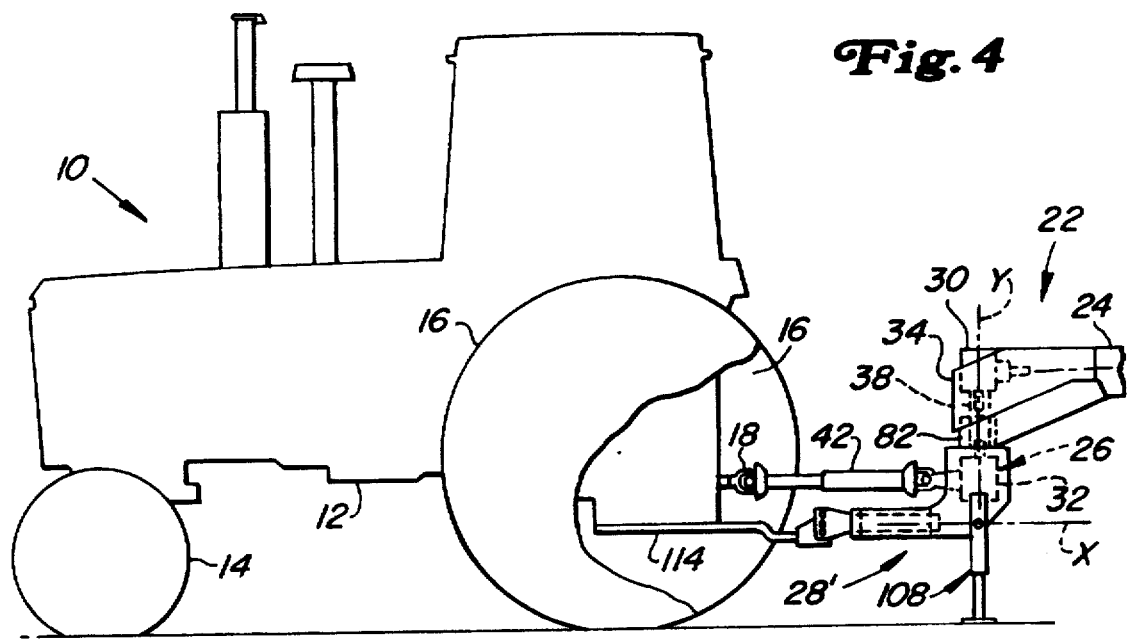

FIG. 4 is a right side elevational view like that of FIG. 1, but showing an alternate embodiment of the longitudinal pivot member wherein a clevis is provided at its forward end and coupled to a drawbar attaching device, which in turn, is coupled to the tractor drawbar.

Figure 5:
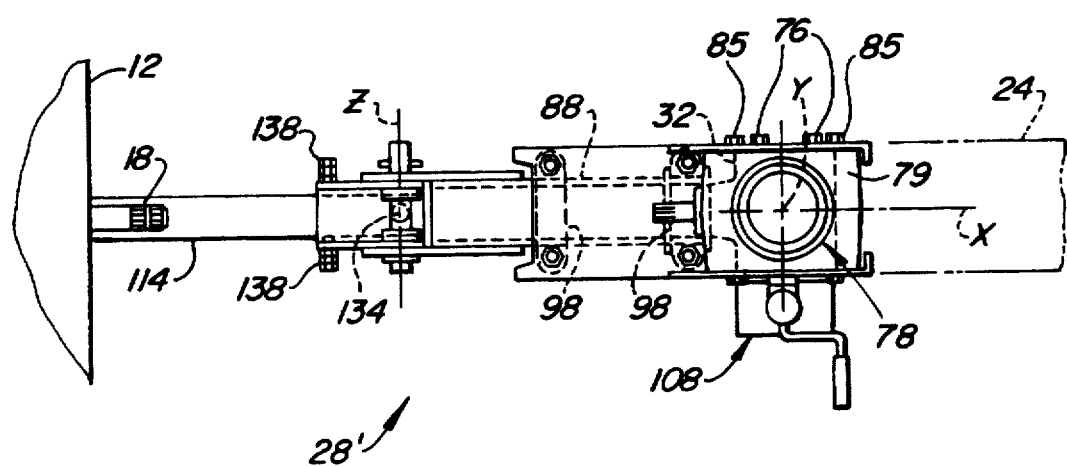

FIG. 5 is a top view like FIG. 2 but showing the embodiment of the longitudinal pivot member illustrated in FIG. 4.

Figure 6:
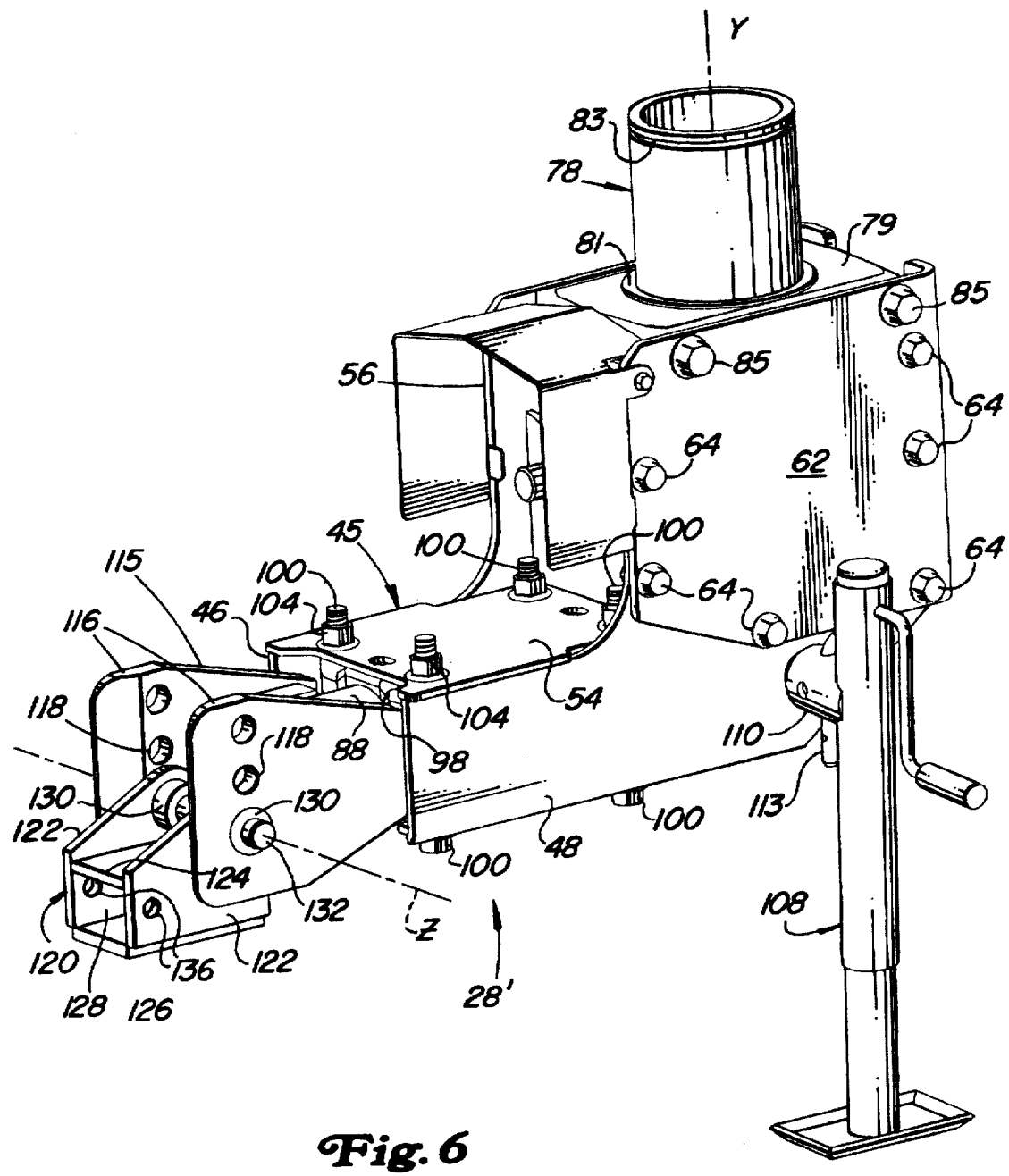

FIG. 6 is a perspective view of the swivel hitch shown in FIGS. 4 and 5.

DESCRIPTION OF THE PREFERRED EMBODIMENT

Referring now to FIGS. 1 and 2, there is shown a tractor 10 including a longitudinally extending body 12 supported on a pair of steerable front wheels 14 and on a pair of rear driven wheels 16. The tractor includes an engine-driven transmission (not shown) including a PTO shaft 18 projecting through a rear wall of the transmission housing at a location centered between the rear wheels 16. A pair of lower draft links 20 are vertically pivotally mounted to opposite side locations of the tractor body 12 between the rear wheels 16 and equidistant from the PTO shaft 18. An upper center link (not shown) would be present with tractors equipped with a three-point hitch but would not be used in the present hitch application.

As shown in FIG. 1, a forward end portion of a towed, PTO-driven implement 22 is defined by a tongue 24 carrying a transmission 26 coupled to the tractor PTO shaft 18 and a swivel hitch structure 28 coupled the lower draft links 20 of the tractor 10. Specifically, the transmission 26 includes upper and lower, identical right-angle gear boxes 30 and 32, with the upper gear box 30 being fixed between parallel vertical plates 34 forming a forward end of the tongue 24, and with the lower gear box 32 being swivelly mounted, as at 36, to the tongue 24 for rotation relative to the upper gear box 30, and hence the implement tongue 24, about a yaw axis Y. The lower gear box 32 has an output shaft (not shown) disposed along the axis Y and coupled, as by a coupler 38, to a similarly disposed input shaft (not shown) of the upper gear box 30, the latter including a rearwardly directed output shaft, which is coupled to a driveline (not shown) for delivering power rearwardly to powered devices of the implement 22. A telescopic drive shaft 42 is coupled between a forwardly directed input shaft 44 of the lower gear box 32 and the tractor PTO shaft 18.

Referring now also to FIGS. 2 and 3, it can be seen that the lower gear box 32 is generally rectangular in top view and located within a complimentary shaped cavity defined by a weldment forming a swivel hitch frame 45. Specifically, the frame 45 comprises transversely spaced, vertical right-, and left-hand sidewalls 46 and 48, respectively, the respective bottoms of which are defined by horizontal inwardly projecting flanges 50 and 52. Spaced vertically from and extending parallel to the flanges 50 and 52 is a horizontal plate 54 that overlies and is welded to top edges of forward sections of the sidewalls 46 and 48. A rear section of the plate 54 is stepped inwardly relative to its forward section and is disposed between a forward portion of an upwardly projecting rear section 56 of the right-hand sidewall 46 and a forward, upwardly projecting mounting lug 58 of the left-hand sidewall 48. A second mounting lug 60 defines a rear portion of the left-hand sidewall. The left-hand sidewall 48 further includes a removable plate 62 sized similarly to the rear section 56 of the right-hand sidewall 46 and spanning the gap between the mounting lugs 58 and 60, the plate 62 being bolted to the lugs 58 and 60 and other portions of the sidewall 48 by a plurality of bolts 64. Respective rear ends of the right-hand sidewall rear section 56 and the plate 62 are defined by inwardly projecting vertical flanges 66 and 68. A reinforcing member 70, which is generally U-shaped in side view, is welded between the right- and left-hand sidewalls 46 and 48 with its bight portion, in effect, defining a rearward extension of the plate 54, and with its respective front and rear legs respectively being located adjacent rear edges of each of the mounting lugs 58 and 60. A rectangular pattern of tapped and threaded holes 72 are provided in each of opposite sides of the gear box 32 and a corresponding pattern of holes 74 is provided in the right-hand sidewall rear section 56, with a plurality of capscrews 76 (FIGS. 2 and 5) being inserted through the holes 74 and threaded into the holes 72 provided on the right-hand side of the gear box 32 to thereby mount the swivel hitch frame 45 to the gear box 32. It is here noted that the distance between the plate 62 and the right-hand sidewall rear section 56 is such that the gear box 32 is tightly sandwiched between the plate 62 and sidewall section 56. The output shaft of the lower gear box 32 extends centrally through a cylindrical tubular vertical pivot member 78 forming a part of the pivot structure 36 which also forms part of the swivel hitch frame 45. integral with, and centered relative to, a lower end of the pivot member 78 is a horizontal mounting plate 79 having an annular groove 80 formed in its upper surface about the member 78 and receiving a thrust bearing member 81 on which rests a lower end of a cylindrical tubular receptacle 82 carried by the implement tongue 24 and having the member 78 received therein. An annular groove 83, provided in an upper portion of the member 78, is located above at the receptacle 82 and contains a circlip (not shown) which holds the member 78 in place within the tubular receptacle. The mounting plate 79 further includes opposite outwardly facing flat surfaces which each contain a pair of tapped and threaded holes 84 receiving respective capscrews 85 that extend through holes 86 provided in each of the right-hand sidewall section 56 and the plate 62.

The swivel hitch structure 28 further includes a cylindrical tubular horizontal pivot member 88 having a forward end fixed to a coupler member 89 including a tubular cross arm 90 and a cylindrical rod 91, the latter having a rear section welded within the member 88 and having a front section extending through and being welded to the cross arm 90 at a location midway between forwardly opening vertical clevises 92 provided at opposite ends of the cross arm. Front and rear thrust rings 94 and 96, respectively, are fixed, in fore-and-aft spaced relationship to each other, to a rearward end portion of the pivot member 88. The pivot member 88 is located between the sidewalls 46 and 48, and below the horizontal plate 54 of the hitch frame 45. Provided for coupling the pivot member 88 to the hitch frame 45 for swivelling about a horizontal longitudinal roll axis X are identical front and rear split bearing members 98. Specifically, opposite halves of the rear bearing member 98 are disposed about the member 88 in a zone between the thrust rings 94 and 96 and are held clamped to each other and to the hitch frame 45 by right- and left-hand clamping bolts 100, respectively, extending vertically upwardly through aligned holes provided in the sidewall flanges 50 and 52, in opposite halves of the rear bearing member 98 and a set of holes 102 provided in the plate 54, with nuts 104 being tightened onto the bolts for holding the parts in place. Opposite halves of the front bearing member 98 are disposed about the pivot member 88 at a location adjacent the cross arm 90 and clamped to each other and to the hitch frame 45 by another set of right-and left-hand clamping bolts respectively extending vertically upwardly through aligned holes provided in sidewall flanges 50 and 52, in the bearing halves, and in the plate 54. Respective nuts 104 are received on these bolts and tightened to hold the associated parts in place. As shown in FIGS. 1 and 2, the lower draft links 20 of the tractor 10 are pivotally connected to the clevises 92 of the cross arm 90 by respective pivot pins 106 aligned with each other along a horizontal transverse pitch axis Z. A parking stand 108 is includes a cylindrical receptacle 110 received on a support pin 112 fixed to and projecting outwardly from the frame sidewall 48, the receptacle being provided with mounting holes offset from each other by ninety degrees for alternate alignment with a vertical hole provided in the support pin 112 and reception of a connection pin 113 (FIG. 6), whereby the parking stand is movable between an upright park position, as shown, and a horizontal stored position.

Referring now to FIGS. 4, 5 and 6 there is shown an alternate swivel hitch structure 28' constructed for attachment to a tractor drawbar 114 and having many components which are identical to those mentioned above in the description of the swivel hitch structure 28. For the sake of brevity, these components are not further described but are given the same reference numerals as the above-described like components.

One difference between the hitch structure 28' and the hitch structure 28 is that a coupler member 115 is provided in lieu of the previously described coupler member 89. Specifically, the coupler member 115 includes a pair of transversely spaced, vertical plates 116 welded to opposite sides of the forward end of the longitudinal pivot member 88 to form a vertical clevis 116. The plates 116 forming the clevis are each provided with a plurality of vertically spaced holes, with holes in one plate being axially aligned with holes in the other plate to define a plurality of sets of mounting holes 118. A further difference resides the provision of a drawbar attaching device or adaptor 120 having a pair of transversely spaced side plates 122 coupled together by vertically spaced upper and lower plates 124 and 126 which cooperate with the side plates to define a drawbar receptacle 128 having a cross section shaped generally complementary to the drawbar 114. Upper rear locations of the side plates 122 of the adaptor 120 are provided with aligned holes in which are welded cylindrical bushings 130. The adaptor 120 is located between the clevis plates 116 and is mounted thereto by a coupling pin 132 received in one of the sets of clevis mounting holes 118 and the bushings 130. The coupling pin 132 defines the horizontal transverse pitch axis Z.

The drawbar 114 extends through the receptacle 128 of the drawbar attaching device or adaptor 120, the latter being provided with vertically aligned holes (not visible in FIG. 6) in the upper and lower plates 124 and 126 that are aligned with a hole provided in the drawbar. A hitch pin 134 is received in these aligned holes thereby securing the adaptor 120 to the drawbar 114. It is noted that the drawbar attaching device or adaptor 120 would normally be subassembled prior to the adaptor being coupled to the clevis plates 116 by the coupling pin 132. Although not required for successful operaton, it is noted that when the adaptor 120 is coupled to the clevis plates 116, the coupling pin 132 is located directly above and closely to the hitch pin 134 so as to prevent it from escaping from its mounting holes. The adaptor 120 further includes a set of transversely aligned threaded holes 136 located in forward locations of the side plates 122 and receiving screws 138 for the purpose of taking up any clearance that might exist between the drawbar receptacle 128 and the sides of the drawbar 114.

It is noted that a significant portion of the weight of the implement tongue 24 and drive components carried by the tongue is transferred to the tractor drawbar 114 through the pin 132. Accordingly, the pin 132 is located as far forward on the drawbar 114 as is practicable so as to minimize the bending force exerted on the drawbar due to this weight.

The operation of the swivel hitches 28 and 28' is similar in that they are attached to the swivel-mounted lower gear box 32 thus permitting the tractor 10 to turn about the yaw axis Y relative to the implement 22. Further, as the tractor/implement combination travels across uneven ground, relative motion will occur about the roll axis X, as is permitted by the longitudinal swivel member 88, and about the pitch axis Z, as permitted by the coupling pins 106, of the embodiment disclosed in FIGS. 1–3, or by the coupling pin 132 of the embodiment disclosed in FIGS. 4–6.

Thus, it will be appreciated that the swivel hitches 28 and 28' share a large number of common parts with the main difference being the coupler members 89 or 115 that are fixed to the forward end of the longitudinal pivot member 88 so as to adapt the latter for attachment either to a pair of tractor draft links or to a tractor drawbar. It is to be noted that the parking stand 108 is somewhat essential for attaching the swivel hitch 28' to the drawbar 114, since it holds the tongue 24 at the proper height for the drawbar adaptor 120, which has been preassembled to the drawbar 114, to be coupled to the clevis plates 116 of the coupler member 115, but may be omitted from the swivel hitch 28 since the draft links 20 may be raised and lowered by conventional hydraulically controlled linkage (not shown) carried by the tractor 10.

We claim:

1. In combination with an implement including a tongue, a transmission supported at a forward end of said tongue including an upper section having an input shaft disposed along an upright yaw axis and coupled to an output shaft of a lower right-angle gear box mounted to the tongue for swivelling about said yaw axis and having a forwardly projecting input shaft adapted for connection to a towing tractor power take-off shaft, a swivel hitch structure comprising: a frame secured to said lower right-angle gear box for swivelling therewith about said yaw axis; a longitudinally extending pivot member; means mounting said longitudinally extending pivot member to said frame, exclusive of said input shaft of said lower right-angle gear box, for swivelling about a roll axis extending perpendicular to, and intersecting, said yaw axis; and a coupling member being rigidly fixed to said pivot member and defining an attachment structure adapted for connection to one of either a pair of tractor draft links or a tractor drawbar for establishing a horizontal, transverse pitch axis.

2. The combination defined in claim 1 wherein said coupling member includes a cross arm extending transversely to said longitudinally extending pivot member and being provided with a pair of laterally spaced draft link connection structures respectively disposed equidistant to opposite sides of said roll axis; and said pair of draft link connection structures being adapted for connection to said pair of tractor draft links so as to establish said horizontal transverse pitch axis.

3. The combination defined in claim 2 wherein said pair of laterally spaced draft link connection structures are each defined by a vertical clevis adapted for having one of the draft links received therebetween and pinned thereto.

4. The combination defined in claim 1 wherein said coupling member includes a drawbar connection structure containing at least on hole located along said pitch axis; and a drawbar adaptor being coupled to said drawbar connection structure by a coupling pin located in said at least one hole.

5. The combination defined in claim 4 wherein said coupling member comprises a clevis defined by first and second vertical plates respectively fixed to opposite sides of said longitudinally extending pivot member; said at least one hole being in said first plate; and a second hole being provided in said second plate in transverse alignment with said at least one hole; and said coupling pin being received in said at least one and second holes.

6. The combination defined in claim 5 wherein said drawbar adaptor is received between said first and second plates and includes a fore-and-aft extending receptacle adapted for receiving the tractor drawbar.

7. The combination defined in claim 4 wherein said drawbar adaptor includes a fore-and-aft extending receptacle adapted for receiving the tractor drawbar and with said one hole and said coupling pin being located such that said pitch axis is located at least as far forwardly as a rear end of the tractor drawbar when the latter is received in said receptacle, whereby bending loads imposed on the drawbar due to the weight of the tongue and associated drive components are minimized.

8. The combination defined in claim 4 wherein said drawbar adaptor includes vertical hole means receving a vertical hitch pin adapted for securing said adaptor to said drawbar; and said pitch axis being located above and close to said vertical hole means, whereby said coupling pin retains said hitch pin in said vertical hole means.

9. The combination defined in claim 1 wherein said hitch member includes an arm fixed to and extending transversely to said longitudinally extending pivot member; first and second vertical clevises fixed to and projecting forwardly from said arm at respective locations spaced equally to opposite sides of said roll axis; and said clevises containing transversely aligned holes adapted for receiving pin means for securing said arm to the tractor draft links for relative pivotal movement about said pitch axis.

10. The combination defined in claim 1 wherein said hitch frame includes transversely spaced, right- and left-hand sidewalls having upwardly projecting rearward sections secured to opposite sides of said lower right-angle gear box; and an upwardly oriented cylindrical tubular member being integral with a horizontal mounting plate and arranged along said yaw axis; and said upwardly projecting rearward sections of said hitch frame side walls being secured to said mounting plate whereby said cylindrical tubular member swivels with said lower right-angle gear box and said hitch frame.

11. The combination defined in claim 1 wherein said hitch frame includes transversely spaced, right- and left-hand sidewalls including forward sections disposed on opposite sides of said longitudinally extending pivot member and having a horizontal plate joining said right- and left-hand sidewalls and being disposed above said longitudinally extending pivot member; first and second split bearing members fixed to longitudinally spaced locations of said horizontal plate and swivelly receiving said longitudinally extending pivot member; and thrust ring means carried by said longitudinally extending pivot member for preventing the latter from shifting axially within said split bearing members.

* * * * *